United States Patent [19]
Neti et al.

[11] 3,840,342
[45] Oct. 8, 1974

[54] NITROGEN DIOXIDE CONVERSION

[75] Inventors: Radhakrishna M. Neti, Brea; Raymond E. Rocks, Santa Ana, both of Calif.

[73] Assignee: Beckman Instruments, Inc., Fullerton, Calif.

[22] Filed: July 2, 1971

[21] Appl. No.: 159,470

[52] U.S. Cl. .................. 23/232 R, 204/157.1 R
[51] Int. Cl. ................... B01j 1/10, G01n 27/64
[58] Field of Search .......... 204/157.1 R; 23/232 R; 250/71.5 R, 72, 461, 395, 484

[56] References Cited
UNITED STATES PATENTS

| | | | |
|---|---|---|---|
| 3,230,033 | 1/1966 | Hamilton et al. | 204/157.1 |
| 3,647,387 | 3/1972 | Benson et al. | 23/232 R |
| 3,652,227 | 3/1972 | Harman et al. | 23/232 R |

OTHER PUBLICATIONS

Norrish, J. Chem. Soc., (1929), pages 1,604–1,606.

*Primary Examiner*—Howard S. Williams
*Attorney, Agent, or Firm*—R. J. Steinmeyer; P. R. Harder

[57] ABSTRACT

The method of converting nitrogen dioxide to nitric oxide which includes maintaining the nitrogen dioxide at a temperature from about 40°C to about 130°C. The nitrogen dioxide is exposed to ultraviolet radiation, whereby the nitrogen dioxide is converted to nitric oxide. A method of measuring nitrogen dioxide utilizing this conversion is also disclosed.

8 Claims, No Drawings

NITROGEN DIOXIDE CONVERSION

BACKGROUND OF THE INVENTION

The instant invention relates to the conversion of nitrogen dioxide to nitric oxide. It is particularly applicable to the measurement of nitrogen dioxide, e.g. in a gas stream, wherein the conversion of nitrogen dioxide to nitric oxide is utilized.

Nitrogen dioxide is a common pollutant and thus is normally present in polluted atmospheres. The nitrogen dioxide present in the polluted atmosphere or air is not only a health hazard but also reduces visibility. Nitrogen dioxide in the atmosphere is primarily derived from nitric oxide emitting combustion sources such as the automobile.

At the present time several techniques are being practiced for detecting nitrogen dioxide in gas streams such as the air or atmosphere. Nitrogen dioxide is measured galvanically through the reaction of nitrogen dioxide with iodide in a suitable electrolyte, liberating iodine. The iodine is then reduced at a platinum cathode. The whole process is used in a regenerative cycle.

An alternate method currently in use involves collecting nitrogen dioxide in an aqueous solution and coupling it with an azo dye. The resulting color is used as a measure of the concentration. A third method is to measure the light absorption in the near ultraviolet to visible regions of the light spectrum. Unfortunately, this requires very expensive long path cells which has prevented it becoming widely used.

A fourth method of detection which is coming into use involves the chemiluminescence reaction between ozone and nitric oxide. In order to obtain this measurement, the nitrogen dioxide must be converted to nitric oxide. The so-formed nitric oxide is mixed with ozone in a suitable reaction chamber. Upon mixing of the ozone and nitric oxide, light is emitted as a result of the chemical reaction. The emitted light is a measure of the nitrogen dioxide concentration initially present.

In these procedures as currently practiced, nitrogen dioxide is converted by thermal decomposition to nitric oxide in the presence of a catalyst. The whole chain of reactions can be represented by the following equations:

$$NO_2 \xrightarrow[Au/Pt]{670°-750°} NO + O \qquad \text{i.}$$
$$NO + O_3 \rightarrow NO_2^* + O_2 \qquad \text{ii.}$$
$$NO_2^* \rightarrow NO_2 + h\nu \qquad \text{iii.}$$

Reaction (i) is a temperature dependent reversible reaction. Hence, it is necessary to accurately control the temperature at the elevated range of 670° to 750°C until the nitric oxide mixes with ozone so that the light emitting reaction can be observed. This high temperature is difficult to maintain and in practice the efficiency of the whole process varies from 80 to 95 percent.

SUMMARY OF THE INVENTION

It is an object of the instant invention to provide an accurate, reproducible, reliable method of converting nitrogen dioxide to nitric oxide. This method may advantageously be used to convert nitrogen dioxide to nitric oxide for further reaction with ozone whereby the light emitted by the reaction with ozone can be measured and hence the nitrogen dioxide measured.

According to the instant invention nitrogen dioxide is converted to nitric oxide by maintaining the nitrogen dioxide at a temperature from about 40°C to about 130°C. The nitrogen dioxide is exposed to ultraviolet radiation, whereby the nitrogen dioxide is converted to nitric oxide.

This can advantageously be used in the method of measuring nitrogen dioxide by converting nitrogen dioxide to nitric oxide, reacting the nitric oxide with ozone, and measuring the light emitted by the reaction.

DETAILED DESCRIPTION

Nitrogen dioxide may be decomposed to nitric oxide by the action of light. It is known from the literature that the quantum yield of unity is achieved at wavelengths shorter than 4070 Angstroms (A.) whereby the necessary energy of 71.8 kilo calories is applied to decompose the molecule. However, the published information indicates that as the pressure or concentration of nitrogen dioxide in the stream is reduced the quantum yield decreases approaching zero at low levels such as the concentration levels in polluted atmospheres. The working pressures in the literature references were in the range of $10^{-3}$ to 2 mm Hg. In the present investigations the pressures are about atmospheric.

According to the instant invention nitrogen dioxide may be converted to nitric oxide even at the levels wherein it would be found in polluted atmospheres if the temperature is maintained at a relatively low range, considerably below the 670° to 750°C needed for the thermal decomposition.

In the following examples, the source of ultraviolet radiation known in the trade as a Pen Ray lamp Model 11SC-1, emitting radiation from 1849 A. to 6600 A. was used in a reaction chamber through which a stream of nitrogen dioxide was drawn. In the first test nitrogen dioxide was admitted near the top of the lamp. The temperature at the entry point was measured as 49°C. The nitrogen dioxide concentration was 1.28 parts per million. Before exposure to light or heat the nitrogen dioxide concentration was determined through use of a Beckman Model 908 Oxidant Analyzer without a selective scrubber (which removes nitrogen dioxide), as 1.48 parts per million. This indicated a slight decomposition of nitrogen dioxide by the light emitted from the Pen Ray lamp.

When the flow through the reaction chamber was reversed the nitrogen dioxide was exposed to a temperature of about 55°C at the base of the lamp before being irradiated by the ultraviolet radiation from the lamp. The nitrogen dioxide level then decreased to 0.88 parts per million, thus emphasizing the synergistic effect of the combination of temperature and ultraviolet radiation.

The reaction chamber was then progressively heated to 130°C when the decomposition was determined to be complete. In order to determine if the light and the relatively low temperature of 130°C are synergistic in the decomposition of nitrogen dioxide, the lamp was then turned off with the heat on. The nitrogen dioxide level was restored to that of no light at ambient temperature. This experiment established that temperatures of the order of 130°C alone do not cause the decomposition of nitrogen dioxide and that ultraviolet light at the levels emitted by the light source used cannot quantitatively cause the photodecomposition of nitrogen dioxide. They further indicated that thermal activation, i.e. maintaining the nitrogen dioxide at a temperature from about 40° to about 130°C followed by radiation or irradiation would photodissociate the nitrogen dioxide to nitric oxide. The nitric oxide so formed can then be moved into the reaction chamber with ozone and the emitted light as a consequence of the reaction between the nitric oxide and ozone used to measure the nitrogen dioxide present initially.

Results of the experiments are listed in Table I below:

Table I

|  | Temperature °C | (NO$_2$) ppm | |
|---|---|---|---|
|  | 19.5 | (no light) | 1.5 |  |
|  | 130 | (no light) | 1.5 |  |
|  | 40 |  | 1.37 | Pen Ray lamp run at |
|  | 54 |  | 0.88 | ambient |
|  | 49 | Irradiated | 0.88 | temperature of |
| external | 81 | with | 0.4 | 19.5°C |
| heat | 99 | UV light | 0.08 |  |
|  | 130 |  | 0.00 |  |

The method of nitrogen dioxide conversion according to the instant invention can be used from a few parts ber billion to several hundred parts per million. The approach does not have the drawbacks of catalytic poisoning which is present in the thermal decomposition of nitrogen dioxide in the presence of noble metals as indicated in reaction (i) above. The thermal decomposition of nitrogen dioxide in the presence of noble metals has a further drawback in that the oxidation of ammonia formed under certain circumstances using catalytic mufflers on automobile exhaust systems and thus present in the gas stream is favored, thus creating an interference for the nitrogen dioxide conversion reaction. The results show that radiation from a wavelength of about 1849 A. to 6600 A. is effective through radiation from 1849 A. to about 4070 A. is probably most effective. The most desirable temperature for the nitrogen dioxide is also indicated to be 130°C although temperatures from 40°C to about 130°C are effective.

While there has been shown and described hereinabove possible embodiments of this invention, it is to be understood that the invention is not limited thereto and that various changes, alterations, and modifications can be made thereto without departing from the spirit and scope thereof as defined in the claims wherein:

We claim:

1. The method of converting nitrogen dioxide to nitric oxide which comprises
  a. subjecting air at substantially atmospheric pressure containing nitrogen dioxide in the range between a few parts per billion and several hundred parts per million to heat and artificial ultraviolet radiation while
  b. maintaining the nitrogen dioxide at a temperature from about 40°C to about 130°C; and
  c. exposing the nitrogen dioxide to ultraviolet radiation from an artifical source at wavelengths sufficient to convert the nitrogen dioxide to nitric oxide.

2. The method of claim 1 wherein the radiation is at wavelengths from about 1,849 A. to about 6,600 A.

3. The method of claim 1 wherein the radiation is at wavelengths from about 1,849 A. to about 4,070 A.

4. The method of claim 1 wherein the nitrogen dioxide is maintained at a temperature of about 130°C.

5. In the method of measuring nitrogen dioxide by converting nitrogen dioxide to nitric oxide, reacting the nitric oxide with ozone, and measuring the light emitted by the reaction, the improvement which comprises:

a. subjecting air containing nitrogen dioxide in the range between a few parts per billion and several hundred parts per million to heat and artificial ultraviolet radiation at substantially atmospheric pressure
  b. maintaining the air containing nitrogen dioxide at a temperature from about 40°C to about 130°C; and
  c. exposing the air and nitrogen dioxide contained therein to ultraviolet radiation from the artificial source at wavelengths sufficient to convert the nitrogen dioxide to nitric oxide.

6. The method of claim 5 wherein the radiation is at wavelengths from about 1,849 A. to about 6,600 A.

7. The method of claim 5 wherein the radiation is at wavelengths from about 1,849 A. to about 4,070 A.

8. The method of claim 5 wherein the nitrogen dioxide is maintained at a temperature of about 130°C.

* * * * *